United States Patent
Stanhope et al.

(10) Patent No.: US 12,317,766 B2
(45) Date of Patent: Jun. 3, 2025

(54) CENTRAL PRESS WHEEL INFLATION SYSTEM

(71) Applicant: CNH Industrial America LLC, New Holland, PA (US)

(72) Inventors: Trevor Philip Stanhope, Oak Lawn, IL (US); Darian E. Landolt, Evanston, IL (US)

(*) Notice: Subject to any disclaimer, the term of this patent is extended or adjusted under 35 U.S.C. 154(b) by 252 days.

(21) Appl. No.: 18/086,060

(22) Filed: Dec. 21, 2022

(65) Prior Publication Data
US 2024/0206362 A1   Jun. 27, 2024

(51) Int. Cl.
*A01B 63/10* (2006.01)
*A01B 79/00* (2006.01)
*A01C 5/06* (2006.01)

(52) U.S. Cl.
CPC ............ *A01B 63/10* (2013.01); *A01B 79/005* (2013.01); *A01C 5/068* (2013.01)

(58) Field of Classification Search
CPC ........ A01B 63/10; A01B 79/005; A01C 5/068
See application file for complete search history.

(56) References Cited

U.S. PATENT DOCUMENTS

| | | | |
|---|---|---|---|
| 4,995,325 A | 2/1991 | Herriau et al. | |
| 9,148,989 B2 | 10/2015 | Van Buskirk et al. | |
| 9,750,174 B2* | 9/2017 | Sauder | A01B 79/005 |
| 2014/0117746 A1* | 5/2014 | Pope | B60B 11/06 |
| | | | 301/35.628 |
| 2016/0016470 A1* | 1/2016 | Pichlmaier | G07C 5/0808 |
| | | | 701/34.2 |
| 2017/0105333 A1* | 4/2017 | Glenn | B60C 23/00336 |
| 2019/0308471 A1* | 10/2019 | Fiorati | B62D 49/0621 |
| 2021/0007273 A1 | 1/2021 | McCloskey | |
| 2021/0029877 A1* | 2/2021 | Vandike | A01D 69/00 |
| 2022/0258548 A1* | 8/2022 | Nordmeyer | G01S 13/06 |

FOREIGN PATENT DOCUMENTS

| | | |
|---|---|---|
| EP | 3398422 A1 | 11/2018 |
| FR | 2885008 B1 | 11/2007 |
| GB | 749581 A | 5/1956 |

OTHER PUBLICATIONS

CropLife Staff; "Pioneer: Reduce Planter Down Pressure to Minimize Sidewall Compaction"; Mar. 21, 2013; 3 pgs.
Dekalb; "Equipment Adjustments for Planting Soybean"; Oct. 27, 2020; 6 pgs.

* cited by examiner

*Primary Examiner* — Seth A Silverman
(74) *Attorney, Agent, or Firm* — Rebecca Henkel; Richard K. DeMille; Peter K. Zacharias

(57) ABSTRACT

An agricultural implement system that may utilize a central press wheel inflation system to provide variable pressure to press wheels within multiple row units distributed across a width of the agricultural implement system. The agricultural implement system may automatically modify a shape or contact area of the press wheels using variations of press wheel pressure based on various sensor data and performance/behavior data of other row unit control systems. The central press wheel inflation system may provide one or more air lines coupled to the press wheels, allowing internal pressure of the press wheels to be adjusted, thus effectively creating a V-shaped or V-press-like second stage contact patch that may be beneficial in certain soil conditions.

12 Claims, 5 Drawing Sheets

1

CENTRAL PRESS WHEEL INFLATION SYSTEM

BACKGROUND

The present disclosure relates generally to a tire inflation system for an agricultural implement. More specifically, the disclosure is directed to a central tire inflation system for press wheels of an agricultural implement.

A planting implement (e.g., planter) may be towed behind an agricultural vehicle (e.g., tractor) via a mounting component (e.g., bracket, drawbar, or a three-point hitch) secured to a rigid frame of the implement. The planting implement may include multiple row units distributed across a width of the implement. Each row unit may be configured to deposit agricultural product (e.g., seeds) at a desired depth beneath the soil surface of a field, thereby establishing rows of planted seeds. For example, each row unit may include a ground engaging tool (e.g., opener) that may penetrate the soil and form a seeding path (e.g., trench) for seed deposition into the soil. An agricultural product conveying system (e.g., seed tube or powered agricultural product conveyor) may be configured to deposit seeds and/or other agricultural products (e.g., fertilizer) into the trench. The ground engaging tool and/or agricultural product conveying system may be followed by closing disks that move displaced soil back into the trench and/or a press wheel that packs the soil on top of the deposited seeds.

Under certain circumstances, a user (e.g., farmer) of a planter may desire to adjust press wheel forces applied to the soil based on soil conditions (e.g., hardness, moisture, texture). In some cases, such as operating in hard soil, the user may increase a downforce on the press wheels (e.g., solid wheels made from high density materials) to enhance seed-to-soil contact. However, increasing the downforce may lead to certain agronomic downsides. For example, increased downforce applied by the press wheels may change the effective rigidity of the press wheels, resulting in undesired performance or behavior of the press wheels.

BRIEF DESCRIPTION

In certain embodiments, an air supply system may include a compressed air source configured to supply compressed air and a controller configured to control a distribution of the compressed air between the compressed air source and multiple components of an agricultural implement by preforming actions via a processor, including receiving sensor data from a sensor configured to measure one or more soil conditions in a field, determining the one or more soil conditions based at least in part on the sensor data, determining a target pressure of a press wheel of a row unit of an agricultural implement based at least in part on the one or more soil conditions, and controlling a tire inflation system coupled to the press wheel to adjust an internal pressure of the press wheel to correspond to the target pressure.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
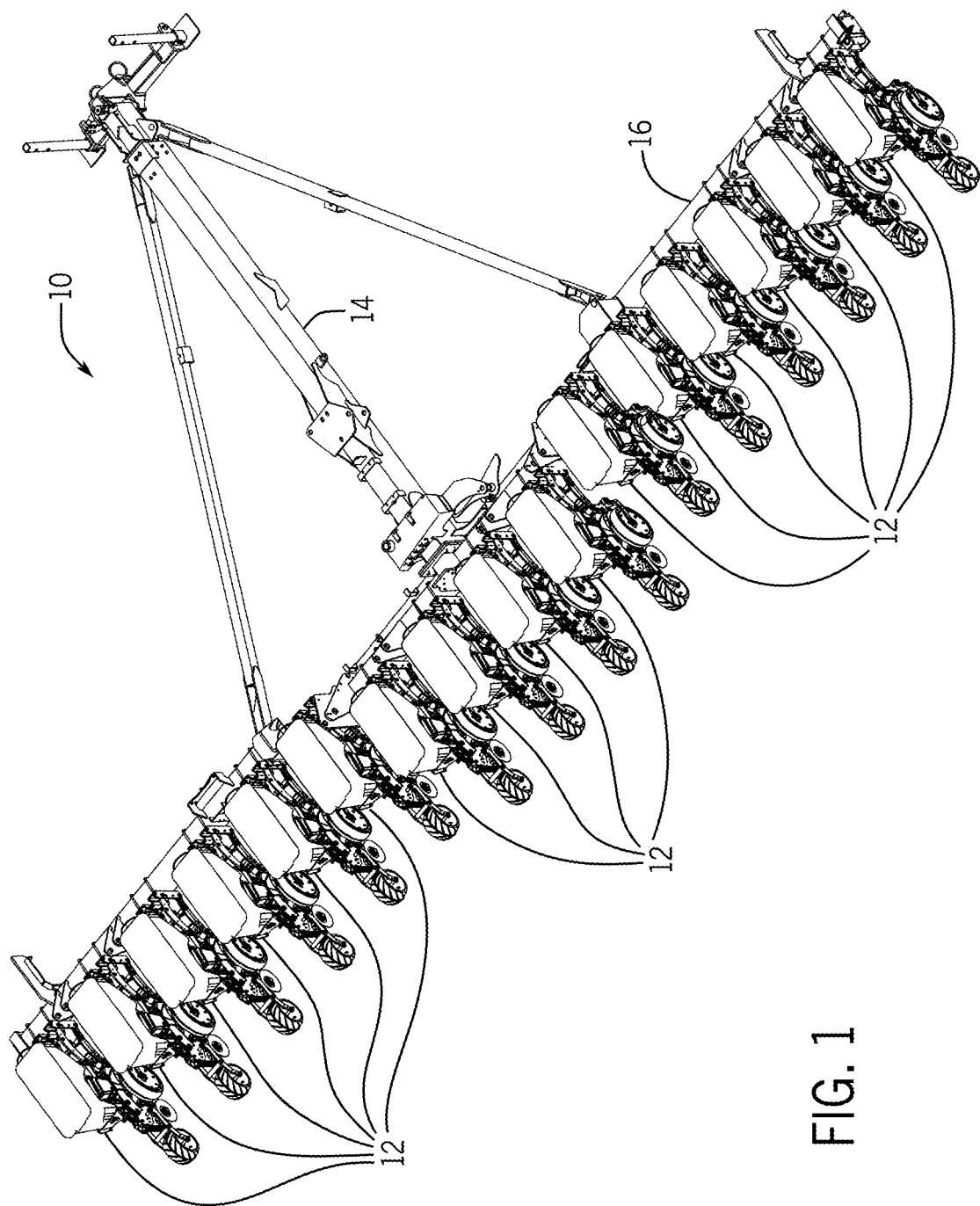
FIG. 1 is a perspective view of an embodiment of an agricultural implement having multiple row units distributed across a width of the agricultural implement.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

A planter row unit may utilize an opener to penetrate soil and to form a seed trench. In addition, the planter row unit may utilize an agricultural product conveying system to deliver seeds and/or other agricultural product(s) to the seed trench. The planter row unit may also utilize a press wheel to firm or pack the soil, thereby enhancing seed-to-soil contact. A user may desire to adjust the force applied by the press wheel of each row unit to firm or pack the soil based on different soil conditions. One way to adjust the force applied by each press wheel is to actively control the downforce on the press wheel (e.g., solid wheel). However, changing the downforce may alter certain properties (e.g., effective rigidity) of the press wheel, leading to certain undesired performance or behavior of the press wheel, which may create certain agronomic downsides.

Embodiments of the present disclosure are generally directed toward an agricultural implement (e.g., planting implement) that may utilize a central press wheel inflation system (CPWIS) to provide variable pressure to press (e.g., packer) wheels within multiple row units distributed across a width of the agricultural implement. The CPWIS may also modify the shape and/or contact area of press wheels by varying the press wheel pressure (e.g., the outer edges of the press wheels may increase in diameter in response to increased pressure). For instance, adjusting the shape of the press wheels may be performed by adjusting the internal pressure of the press wheels based on various sensor data, such as soil condition data (e.g., hardness, moisture, texture, organic content) and soil image data (e.g., images of seeing trenches), and/or performance/behavior data of other row unit components (e.g., residue manager assembly, gauge-wheels, closing assembly).

The central press wheel inflation system (CPWIS) described in the present disclosure may include one or more air lines coupled to each press wheel, and each press wheel may either be vented or pressurized to change the effective contact patch, applied pressure, shape, or a combination thereof, of the press wheel. Each air line may be coupled to a respective press wheel hub, thereby enabling the internal pressure of the press wheel to be either decreased (e.g., vented) or increased (e.g., inflated), thus effectively establishing a shape that may be beneficial in certain soil conditions (e.g., hard-packed, or tight soil condition). The central press wheel inflation system may be adjusted automatically based on the sensor data and/or performance/behavior data, manually by an operator (e.g., in a cab of the work vehicle), or a combination thereof.

By way of introduction, FIG. 1 is a perspective view of an embodiment of an agricultural implement 10 (e.g., planting implement) having multiple row units 12 distributed across a width of the agricultural implement 10. The implement 10 is configured to be towed through a field behind a work vehicle, such as a tractor. As illustrated, the implement 10 includes a tongue assembly 14, which includes a hitch configured to couple the implement 10 to an appropriate tractor hitch (e.g., via a ball, clevis, or other coupling). The tongue assembly 14 is coupled to a tool bar 16 which supports multiple row units 12.

Each row unit 12 may include one or more opener discs configured to form a seed path (e.g., trench) within soil of the field. The row unit 12 may also include an agricultural product conveying system (e.g., seed tube or powered agricultural product conveyer) configured to deposit seeds and/or other agricultural product(s) (e.g., fertilizer) into the seed path/trench. In addition, the row unit 12 may include closing disc(s) and press/packer wheel(s) positioned behind the agricultural product conveying system. The closing disc(s) are configured to move displaced soil back into the seed path/trench, and the press/packer wheel(s) are configured to pack soil on top of the deposited seeds/other agricultural product(s). Additionally or alternatively, the row unit 12 may include residue management wheel(s) positioned in front of the opener discs and configured to break up and/or displace residue and debris (e.g., clods) on a surface of the soil.

The agricultural implement 10 may utilize a central press wheel inflation system (CPWIS) to provide variable pressure to the press/packer wheel(s) of each row unit 12. Instead of actively controlling a downforce on the press wheel, the CPWIS may adjust (e.g., increase) an internal pressure of the wheel based on various sensor data (e.g., soil condition data, soil image data), thereby dynamically adjusting the shape of the press wheel. For example, the CPWIS may adjust the shape of the press wheel by having an inflation that increases outer edges of the press wheel, forming a V-shaped or V-press-like second stage contact patch.

Figure 2:
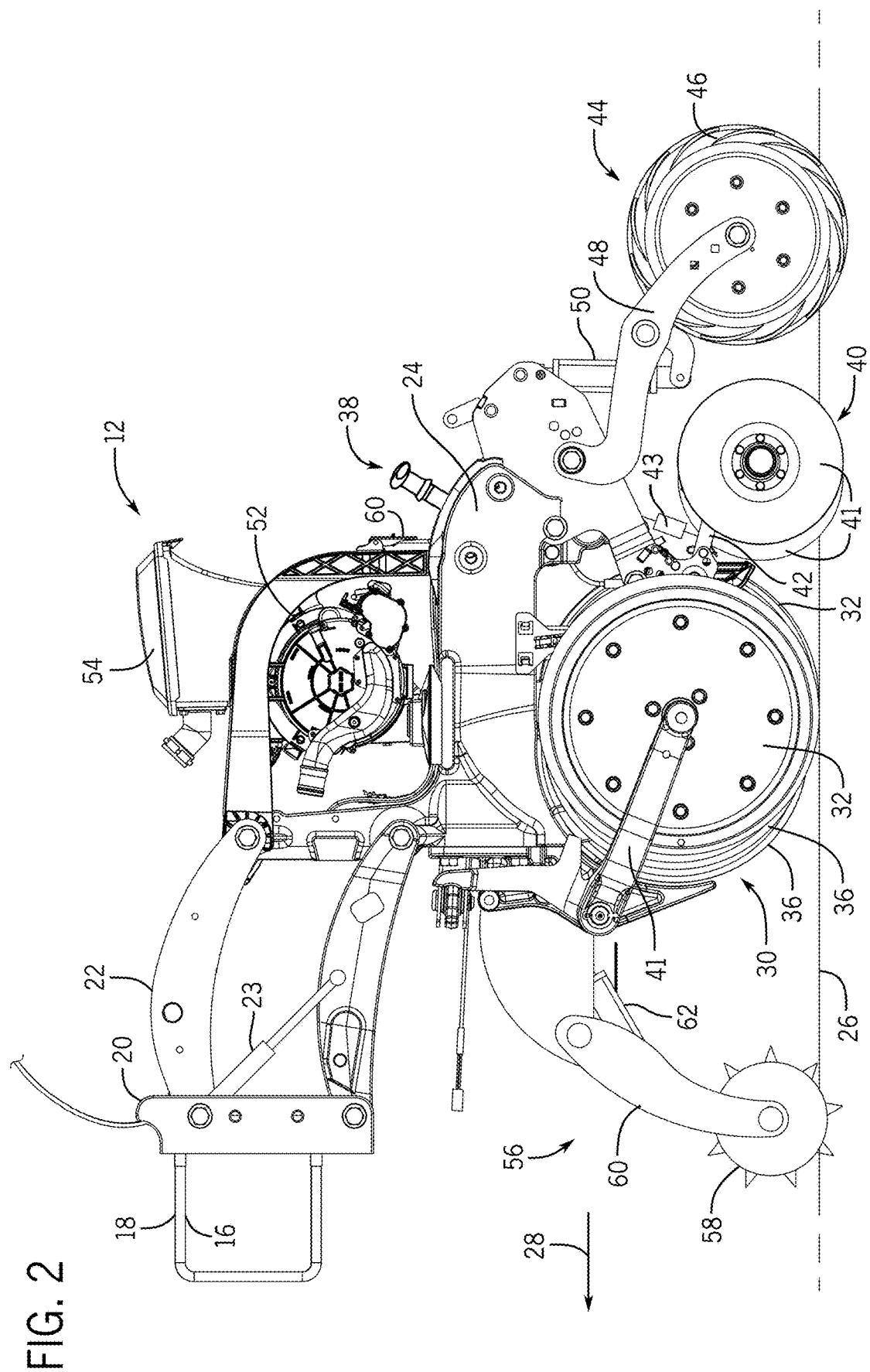
FIG. 2 is a side view of an embodiment of a row unit that may be employed on the agricultural implement of FIG. 1.

FIG. 2 is a side view of an embodiment of a row unit 12 that may be employed on the agricultural implement 10 of FIG. 1. The row unit 12 includes a mount 18 configured to secure the row unit 12 to the tool bar 16 of the agricultural implement 10. In the illustrated embodiment, the mount 18 includes a u-bolt that secures a bracket 20 of the row unit 12 to the tool bar 16. However, in alternative embodiments, the mount may include any suitable device that may couple the row unit to the tool bar. A linkage assembly 22 extends from the bracket 20 to a frame 24 of the row unit 12. The linkage assembly 22 is configured to enable vertical movement of the frame 24 relative to the tool bar 16 in response to variations in a soil surface 26. In certain embodiments, an actuator 23 (e.g., hydraulic actuator, pneumatic actuator, electromechanical actuator, etc.) is configured to urge the frame 24 toward the soil surface 26. While the illustrated linkage assembly 22 is a parallel linkage assembly (e.g., a four-bar linkage assembly), in other embodiments, another suitable linkage assembly may extend between the bracket and the frame.

The row unit 12 is configured to deposit seeds and/or other agricultural product(s) at a desired depth beneath the soil surface 26 as the row unit 12 traverses a field along a direction of travel 28. The row unit 12 includes an opener assembly 30 that forms a trench in the soil for seed deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate a trench into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil.

The row unit 12 also includes an agricultural product conveying system (e.g., seed tube or powered agricultural product conveyor) configured to deposit seed and/or other agricultural product(s) into the trench. The opener assembly 30 and the agricultural product conveying system are followed by a closing assembly 40 that moves displaced soil back into the trench. In the illustrated embodiment, the closing assembly 40 includes two closing discs 41, and the closing discs 41 are positioned on opposite sides of the trench. The closing discs 41 engage the soil and are driven to rotate as the row unit 12 moves along the direction of travel 28. Rotation of the closing discs 41 drives the displaced soil into the trench, thereby covering the agricultural product with soil. The closing assembly 40 also includes an arm 42 that supports the closing disc(s) 41 and a biasing member 43 (e.g., a spring, a pneumatic cylinder, or a hydraulic cylinder) coupled to the arm 42. The biasing member 43 is configured to urge the closing disc(s) 41 into the soil. While the closing assembly 40 includes two closing discs 41 in the illustrated embodiment, in other embodiments, the closing assembly may include more or fewer closing discs (e.g., 1, 3, 4, or more). Furthermore, in certain embodiments, the closing assembly may be omitted.

In the illustrated embodiment, the closing assembly 40 is followed by a packing assembly 44 configured to pack soil on top of the deposited seeds and/or other agricultural product(s). The packing assembly 44 includes a press wheel (or packer wheel) 46, an arm 48 that pivotally couples the press wheel 46 to the frame 24, and a biasing member 50 configured to urge the press wheel 46 toward the soil surface 26, thereby driving the press wheel 46 to pack soil on top of the deposited seeds and/or other agricultural product(s). While the illustrated biasing member 50 includes a spring, in other embodiments, the biasing member may include another suitable biasing device, such as a hydraulic cylinder or a pneumatic cylinder, among others.

The row unit 12 includes a vacuum seed meter 52 configured to receive agricultural product (e.g., seeds) from a hopper 54. In certain embodiments, the vacuum seed meter 52 includes a disc having multiple openings. An air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the air pressure on each side of the disc is substantially equalized (e.g., at the end of a vacuum passage), thereby enabling the agricultural product (e.g., seed) to enter the agricultural product conveying system (e.g., seed tube or powered agricultural product conveyor). The agricultural product conveying system then directs the agricultural product to the trench. While the illustrated embodiment includes a vacuum seed meter, in other embodiments, other suitable seed/agricultural product meters may be utilized. As used herein, "vacuum" refers to an air pressure that is less than the ambient atmospheric air pressure, and not necessarily 0 pa.

In the illustrated embodiment, the row unit 12 also includes a residue management assembly 56 having one or more residue management wheels 58. As illustrated, the residue management assembly 56 is positioned in front of the opener assembly 30 relative to the direction of travel 28, thereby enabling the residue management wheel(s) 58 to break up and/or displace residue and debris (e.g., clods) on the surface 26 of the soil before the opener disc blade(s) 36 engage the soil. In the illustrated embodiment, the residue management wheel(s) 58 are rotatably coupled to an arm 60, and the arm 60 is pivotally coupled to the frame 24 of the row unit 12. In addition, the residue management assembly 56 includes a biasing element 62 (e.g., spring, pneumatic cylinder, hydraulic cylinder, etc.) extending between the arm 60 and the frame 24 of the row unit 12. The biasing element 62 is configured to drive the residue management wheel(s) 58 to apply a force to the soil. In certain embodiments, the residue management assembly, including the residue management wheel(s), the arm, and the biasing element, may be omitted.

The row unit 12 may utilize the central press wheel inflation system (CPWIS) to provide variable pressure to the press wheel 46. Instead of actively controlling a downforce on the press wheel 46, the CPWIS may dynamically adjust the shape of the press wheel 46 (e.g., increase outer edges of the press wheel 46 by increasing an internal pressure of the press wheel 46, forming a V-shaped or V-press-like second stage contact patch) based on soil condition data and soil image data (e.g., measured by soil condition sensors and cameras). The CPWIS may include one or more tire inflation assemblies each provide variable pressure to a corresponding press wheel 46.

Figure 3:
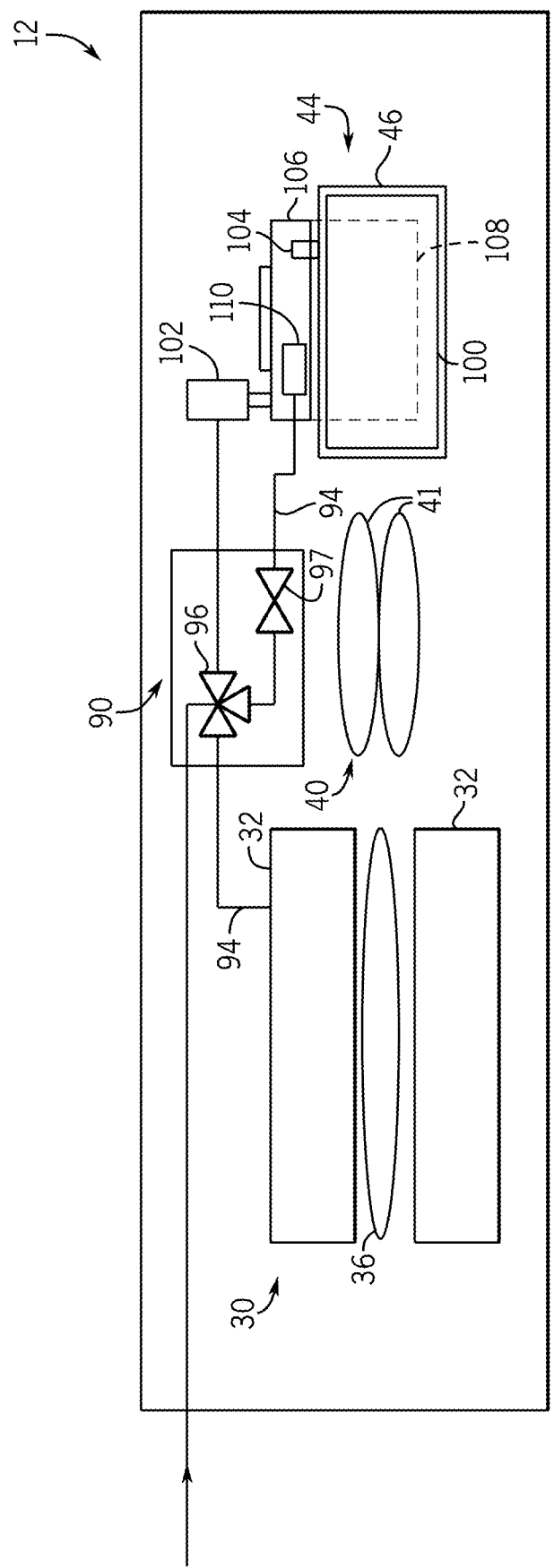
FIG. 3 is a schematic diagram of an embodiment of a tire inflation assembly that may be employed within the row unit of FIG. 2.

FIG. 3 is a schematic diagram of an embodiment of a tire inflation assembly 90 that may be employed within the row unit 12. The tire inflation assembly 90 may be positioned in close proximity to the opener assembly 30 including the gauge wheels 32 and opener disc blade(s) 36, the closing assembly 40 including the closing discs 41, or the packing assembly 44 including the press wheel 46. The tire inflation assembly 90 receives a compressed air 92 from a compressed air source (e.g., a compressor of a work vehicle towing the row unit 12) via a compressed air line 94. The tire inflation assembly 90 may include an air flow control valve 96 (e.g., a three-way valve, a check valve, a priority valve, or any other suitable valves) to control a distribution of the compressed air 92 to different tires or pneumatic components. For example, the tire inflation assembly 90 may use the air flow control valve 96 to control the distribution of the compressed air 92 to the gauge wheels 32, to a press wheel tire 100 of the press wheel 46, or to a pneumatic component 102 (e.g., pneumatic cylinder). Additionally, the tire inflation assembly 90 may include a pressure valve 97 that control air flow to the press wheel tire 100.

The tire inflation assembly 90 may also include one or more sensors (e.g., a tire pressure sensor 104 to measure an internal pressure of the press wheel tire 100). In some embodiments, the one or more sensors may include other types of sensors to acquire soil condition data (e.g., hardness, moisture, texture, organic content), soil image data (e.g., images of seeing trenches), and/or performance/behavior data of other row unit components (e.g., opener assembly 30, closing assembly 40, pneumatic component 102).

The tire inflation assembly 90 may provide variable compressed air 92 to the press wheel tire 100 via the compressed airline 94. The press wheel tire 100 may either be vented or pressurized to change the effective contact patch, applied pressure, and shape of the press wheel 46. For example, the internal pressure of the press wheel tire 100 may either be decreased (e.g., vented) or increased (e.g., inflated). The internal pressure of the press wheel tire 100 may be adjusted automatically based on sensor data indicative of soil conditions, performance/behavior data of other row unit components, input data (e.g., instructions indicative a particular terrain) from an operator in a cab, or a combination thereof.

The tire inflation system 90 includes a rotary union 106, which includes a press wheel hub 108 and other components (e.g., rotor/disk, steering knuckle, bearings). The press wheel tire 100 is mounted on the press wheel hub 108. A rotary connection assembly 110 is formed within the rotary union 106. The rotary connection assembly 110 establishes an airflow path inside the rotatory union 106, thereby enabling pressurized air to flow between the beam housing 98 and a tire (e.g., tire of the press wheel 46). The rotary connection assembly 110 is configured to facilitate airflow between the tire inflation system 90 and the press wheel tire 100 via the airflow path.

As previously discussed, to facilitate depositing seeds, the row unit 12 may include the opener assembly 30, the closing assembly 40, and the packing assembly 44 that includes the press wheel 46. When an opener (e.g., opener disc blade 36) engages the soil, the opener may exert a force that excavates a trench into the soil as the row unit 12 travels through the field. Instead of actively controlling a downforce (e.g., using a hydraulic cylinder or pneumatic cylinder to control a downward force) on the press wheel 46, the central press wheel inflation system (CPWIS) may use the tire inflation assembly 90 to provide variable pressure to the press wheel tire 100, thereby dynamically adjusting the shape of the press wheel 46 (e.g., increase outer edges of the press wheel tire by increasing an internal pressure of the press wheel tire, forming a desired shape (e.g., V-shaped or V-press-like second stage contact patch)) based on soil condition data and soil image data (e.g., measured by soil condition sensors and cameras). Seeds and/or other agricultural product(s) may be deposited into the trench via the seed tube/powered agricultural product conveyor. Then, soil may fall back into the trench or be driven into the trench by the closing assembly 40 and the press wheel 46 may compress the soil on top of the seeds, creating a desired soil environment for the seeds and/or other agricultural product(s).

Figure 4:
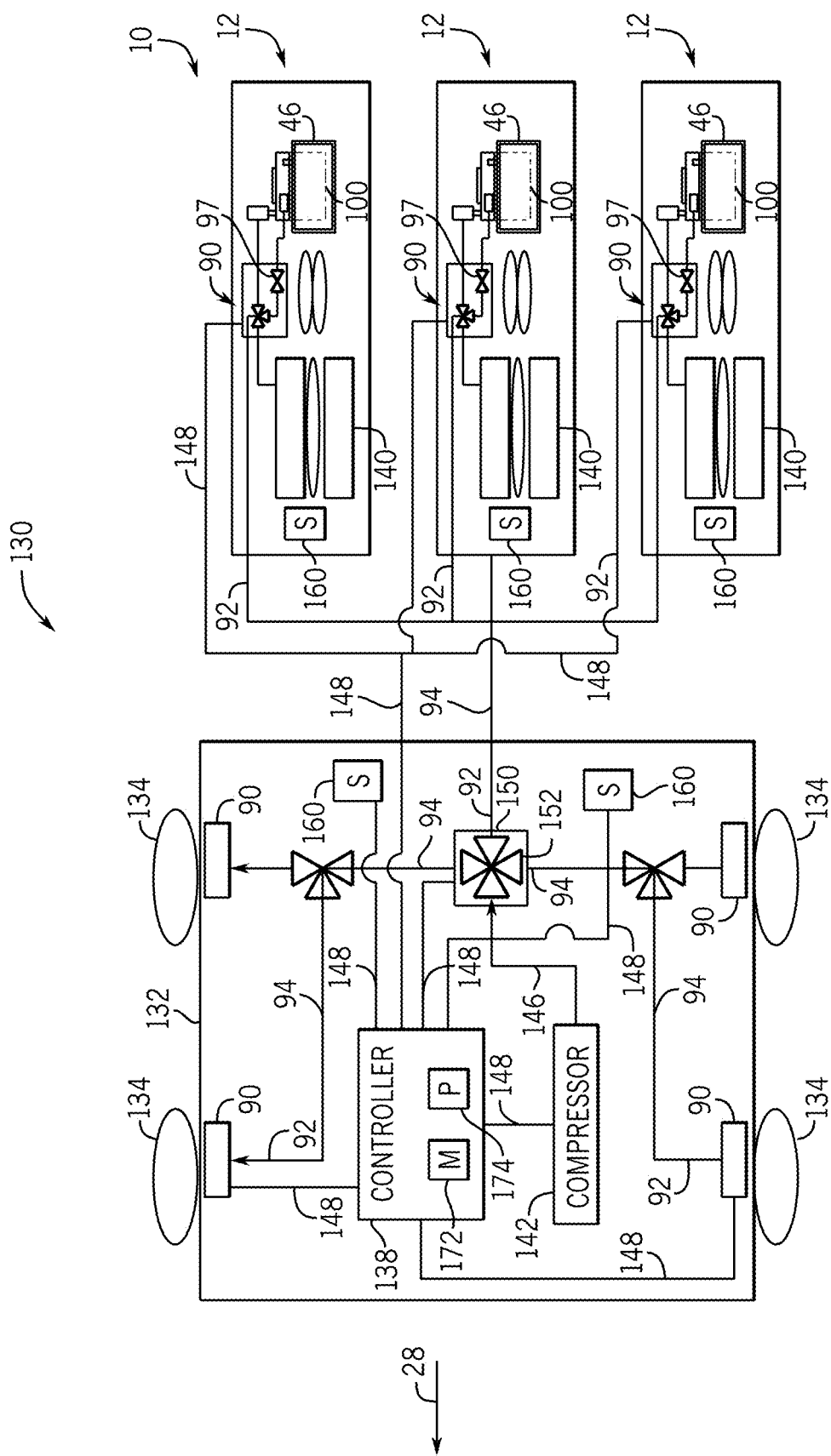
FIG. 4 is a schematic diagram of an embodiment of a tire inflation system having the tire inflation assembly of FIG. 3.

With the forgoing in mind, FIG. 4 is a schematic diagram of an embodiment of a central press wheel inflation system (CPWIS) 130 having multiple tire inflation assemblies 90 of FIG. 3. The CPWIS 130 may be positioned in a work vehicle 132 (e.g., a tractor) towing the agricultural implement 10 having multiple row units 12 along the direction of travel 28. The CPWIS 130 may provide the compressed air 92 to each tire inflation assembly 90, thereby controlling tire inflation of a corresponding press wheel tire 100 of the press wheel 46.

The CPWIS 130 may be a part of a central tire inflation system that provide variable pressure to various tires (e.g., work vehicle tires 134, gauge wheel tires 140) and various pneumatic components of the work vehicle 132 towing the row units 12. For instance, the central tire inflation system may provide adjustable pressure to the press wheel tires 100 of the work vehicle 132 and the press wheels 46 within the row units 12 distributed across a width of the agricultural implement 10.

In some embodiments, a controller 138 of the CPWIS 130 may be configured to control distribution of the compressed air 92 from a compressor 142 of the work vehicle 132 to each tire inflation system 90 controlling inflation of a corresponding tire 134 of the work vehicle 132, to each tire inflation system 90 controlling inflation of the corresponding press wheel tire 100 and/or to other pneumatic components 102 of the agricultural implement 10, or other suitable system(s) or components of the agricultural implement 10.

The CPWIS 130 may include the compressed air lines 94 that may distribute the compressed air 92 from the compressor 142 of the work vehicle 132 to each tire inflation system 90. The compressor 142 may be driven by an engine of the work vehicle 132 (e.g., controlled by a clutch positioned between the engine and the compressor 142). In some embodiments, the compressor 142 may be water cooled. The compressor 142 may receive ambient air at atmospheric pressure, compress the air, and output the compressed air 92 at a higher pressure and a lower volume.

The compressed air 92 may then be used (e.g., by the tire inflation system 90) to increase the pressure of the press wheel tires 100 of the work vehicle 132, the pressure of the press wheels 46, other pneumatic components 102 of the agricultural implement 10, and other pneumatic components and/or systems of the work vehicle 132, such as a pneumatic brake system of the work vehicle 132. The compressor 142 may output the compressed air 92 via a compressed air connection line 146.

The controller 138 communicatively couples, via data communication lines 148, with various components of the work vehicle 132 and the agricultural implement 10, such as the air inflation systems 90, the compressor 148, a valve assembly 150, sensing devices 160, and so on. In some embodiments, the data communication lines 148 may use a communication protocol, such as an ISOBUS including ISO 11783, a communication protocol for the agricultural sector that is based on the SAE J1939 specification recognized as "Tractors and machinery for agriculture and forestry—Serial control and communications data network.

The valve assembly 150 may be positioned between the compressed air connection line 146 and the compressed air line 94 coupled to different air inflation systems 90, other pneumatic components 102 of the agricultural implement 10, and other pneumatic components of the work vehicle 132. In some embodiments, the valve assembly 150 may include one or more control valves 152, such as a multi-way valve, a check valve, a priority valve, or any other suitable valves to control a distribution of the compressed air 92 to different tires or pneumatic components. For example, a check valve may be positioned along the compressed air connection line 146 to block the air flow back toward the compressor 142.

In some embodiment, the central press wheel inflation system (CPWIS) 130 may include one of more additional components, such as an implement compressor of agricultural implement 10 to produce additional compressed air. The additional compressed air from the implement compressor may be used as an alternate and/or supplementary compressed air supply for the tire inflation systems 90. As an alternate compressed air supply, the additional compressed air from the implement compressor may increase fuel efficiency of the work vehicle 132. For example, as the compressor 142 may be controlled by a clutch, the capacity of the compressor 142 may be reduced with the clutch when using the implement compressor, therefore saving fuel. As the alternate and/or supplementary compressed air supply, the additional compressed air from the implement compressor may increase the volumetric flow rate of air within the CPWIS 130 (e.g., as compared to only the output of the compressor 142), which may in turn decrease inflation time of the individual press wheel tires 100 of the work vehicle 132 via the tire inflation system 90. The additional compressed air output from the implement compressor may also be used by pneumatic components 102 of the agricultural implement 10.

The central press wheel inflation system (CPWIS) 130 includes the controller 138 to control distribution and delivery of the compressed air 92. For instance, the controller may control distribution of the compressed air 92 to each press wheel tire 100, thereby dynamically adjusting the internal pressure of each press wheel tire 100 based on different soil conditions. For instance, the controller 138 may receive soil condition data and soil image data from the sensing devices 160. Each sensing device 160 may include one or more sensor, such as soil condition sensors measuring soil conditions (e.g., soil hardness, moisture, texture, organic content, etc.) and cameras capturing soil image data (e.g., images of seeing trenches). Additionally, the controller 138 may receive additional data, such as performance/behavior data of other row unit components (e.g., opener assembly 30, closing assembly 40, pneumatic component 102). In some embodiments, the controller 138 may control distribution of the compressed air 92 between individual press wheel tires 100 of the work vehicle 132.

In some embodiments, the agricultural implement 10 may include an implement controller that may be used to provide additional and/or supplemental control, such as controlling distribution and delivery of the compressed air 92 and/or receiving soil condition data and/or soil image data from the sensing devices 160 positioned on the agricultural implement 10 (e.g., distributed among the row units 12). In some embodiments, the implement controller may pre-process the received soil condition data and/or soil image data and transmit the pre-processed data to the controller 138 of the work vehicle for subsequent data processing (e.g., determining a target pressure of the press wheel tire 100 based on the processed data indicative of soil conditions).

The controller 138 includes a memory 172 and a processor 174. In some embodiments, the memory 172 may include one or more tangible, non-transitory, computer-readable media that store instructions executable by the processor 174 and/or data to be processed by the processor 174. For example, the memory 172 may include access memory (RAM), read only memory (ROM), rewritable non-volatile memory such as flash memory, hard drives, optical discs, and/or the like. Additionally, the processor 174 may include one or more general purpose microprocessors, one or more application specific processors (ASICs), one or more field programmable logic arrays (FPGAs), or any combination thereof. In cases where the implement controller is used, the implement controller may include similar memory and processor.

The controller 138 of the central press wheel inflation system (CPWIS) 130 is configured to control the internal pressure of the press wheel tire 100 within multiple row units 12 distributed across a width of the agricultural implement 10. The controller 138 may adjust the internal pressure of each press wheel tire 100 (e.g., having the inflation increase the diameter of the outer edges of the press wheel tire 100), therefore modifying the shape and/or contact area of the press wheel tire 100. In some embodiments, the controller 138 may adjust the shapes and/or the contact areas of the press wheel tire 100 based on various sensor data from the sensing devices 160, such as soil condition data (e.g., hardness, moisture, texture, organic content) and soil image data (e.g., images of seeding trenches), and/or performance/behavior data of other row unit component(s) (e.g., residue manager system, gauge-wheels, closing assembly).

The central press wheel inflation system (CPWIS) includes one or more compressed air lines 94 coupled to each press wheel tire 100 of a corresponding press wheel 46, and each press wheel tire 100 may either be vented or pressurized to change the effective contact patch, applied pressure, and shape of the press wheel 46. The one or more air lines 94 may be coupled to each press wheel hub 108, thereby enabling the internal pressure of the press wheel tire 100 to be either decreased (e.g., vented) or increased (e.g., inflated). The pressure of each press wheel tire 100 may be adjusted automatically based on the sensor data, performance/behavior data of other row unit components, input data (e.g., instructions indicative a particular terrain on which the work vehicle 132 is currently driving and/or a load being towed by the work vehicle 132) from an operator in a cab, or a combination thereof.

The tire pressure control system 130 includes the sensing devices 160, and each sensing device 160 is communicatively coupled to the controller 138. In operation, the controller 138 may receive various input data from the sensing devices 160 distributed on the work vehicle 132 and/or the agricultural implement 10. Each of the sensing devices 160 may include one or more sensors, such as soil condition sensor(s) (e.g., sensors measuring hardness, moisture, texture, organic content of the soil) and image sensor(s) (e.g., camera(s) acquiring images of seeding trench(es)). In some embodiments, the input data may include additional sensor data from various system and component sensors measuring performance/behavior of different systems and components of the work vehicle 132 and/or the agricultural implement 10. For example, the controller 138 may receive the input data from other row unit control systems indicative of performance associated with opener assembly 30, closing assembly 40, packing assembly 44, residue management assembly 56). For example, the controller 138 may receive tire pressure data from the tire pressure sensor 104 and perform further data processing (e.g., determining target pressure for the press wheels 46 for multiple row units).

In operation, the controller 138 may receive the input data described above from the sensing devices 160. In some embodiments, the controller 138 may receive the input data directly or indirectly from the sensing devices 160. For example, the sensor data acquired from the sensing devices 160 positioned in the row units 12 may be transmitted via a data cable coupled to the controller 138 or wirelessly (e.g., using a transmitter). In some embodiment, the controller 138 may receive certain sensor data from the implement controller coupled to the sensors 160 positioned in the row units 12.

In some embodiments, the controller 138 may adjust the internal pressure of the press wheel tire 100 based on processed sensor data (e.g., sensor data processed by the processors 174 using the instructions and algorithms stored in the memory 172). In some embodiments, the controller 138 may adjust pressure of the press wheels based on processed sensor data and pre-processed data (e.g., data pre-processed by the implement controller).

In some embodiments, the tire pressure control system (CPWIS) 130 may include only one pressure valve 97 that controls air flow to all press wheel tires 100 or several pressure valves 97 that control air flow to groups of press wheel tires 100. When a target pressure is determined by the controller 138 based on various data (e.g., soil condition data, soil image data, press wheel pressure data) or received from a user (e.g., an operator), the controller 138 may compare the current measured pressure of each press wheel tire 100 to the target pressure(s) (e.g., one target pressure for all press wheel tires 100 or one target pressure for each press wheel tire 100). As previously discussed, the controller 138 may determine the current pressure of each press wheel tire 100 based on signals received from pressure sensors 104 disposed at the press wheel tires 100. The received signals are indicative of the current measured pressure within each press wheel tires 100. If the controller 138 determines that the current measured pressure of an individual tire 134 does not correspond to the target pressure, the controller 138 may send a control signal to the corresponding pressure valve 97 to increase or decrease the pressure within the press wheel tire 100 based on the comparison until the current pressure of the press wheel tire 100 reaches the target pressure. Thus, the controller 138 may cause the air pressure within each press wheel tires 100 to correspond to the target pressure. In some embodiments, if the target pressure is lower than the current pressure of the press wheel tires 100, the controller 138 may cause air to be released (e.g., vented) from the press wheel tires 100.

Figure 5:
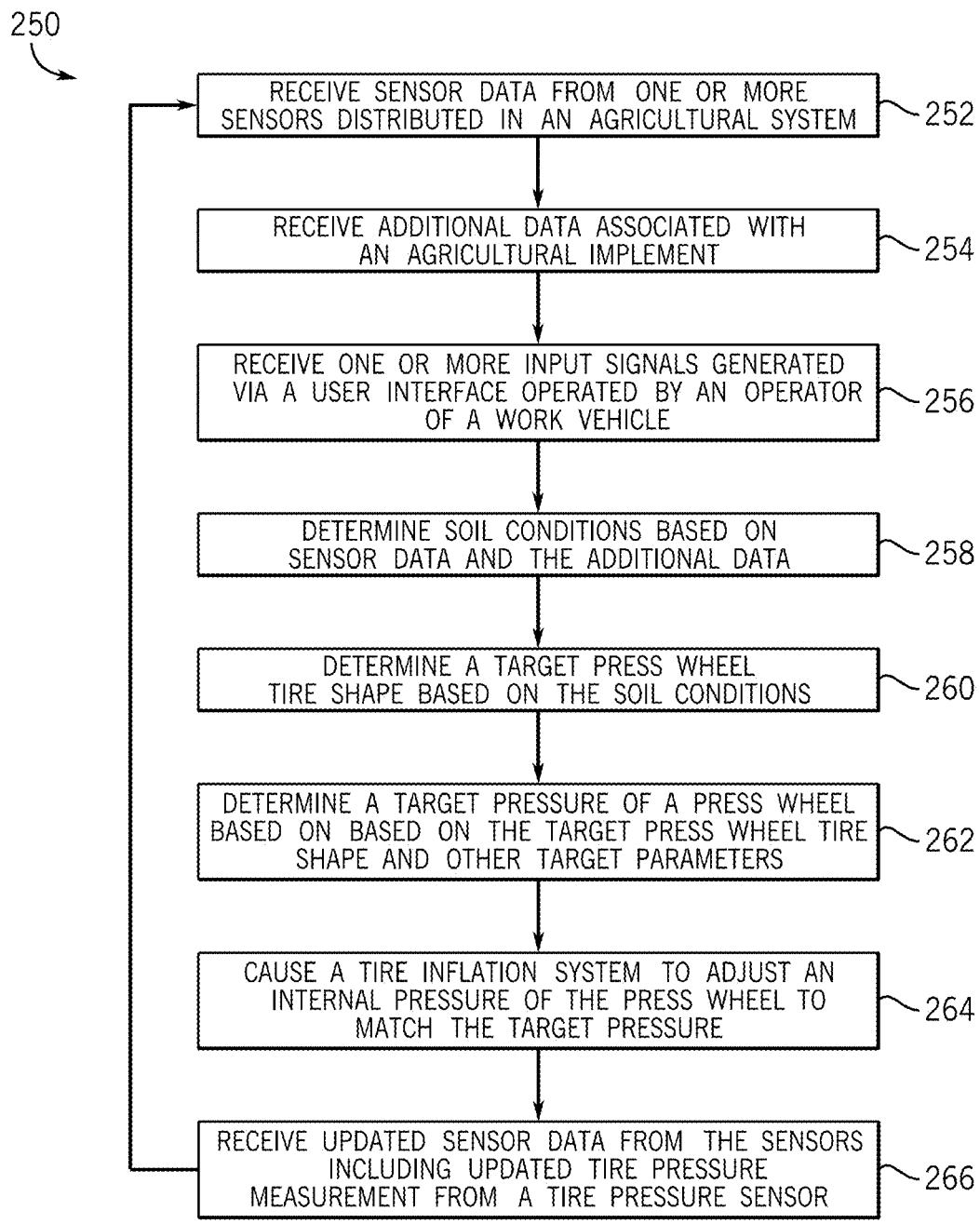
FIG. 5 is a flow diagram of an embodiment of a method for tire inflation and tire shape adjustment utilizing the tire inflation system of FIG. 4.

With the preceeding in mind, FIG. 5 is a flow diagram of an embodiment of a method 250 for tire inflation and tire shape adjustment utilizing the tire inflation system of FIG. 4. The method 250 may be performed by the controller 138 and executing (e.g., using processor 174) computer-readable instructions stored on memory or storage (e.g., the memory 172).

Although the steps of the method 250 described with reference to FIG. 5 are described in a particular order, the steps of the method 250 may be performed in any suitable order and is not limited to the order presented herein. Although each step is described below in the method 250 as being performed by the controller 138, other suitable devices may perform the steps of the method described herein.

Referring now to FIG. 5, at block 252, a processor (e.g., processor 174 of the controller 138) receives sensor data from one or more sensors distributed in an agricultural system (e.g., including the agricultural implement and/or the work vehicle). For example, the processor may receive the sensor data from the sensors 160 configured to output soil data, such as soil condition data (e.g., hardness, moisture, texture, organic content) and soil image data (e.g., images of seeding trenches). In some embodiments, the processor may also receive sensor data including performance/behavior data from other row unit components (e.g., the opener assembly 30, closing assembly 40, packing assembly 44, residue management assembly 56).

At block 254, the processor receives additional data associated with an agricultural implement. For example, the additional data may include pressure data from the tire pressure sensors 104 disposed at the press wheel tires 100.

At block 256, the processor receives one or more input signals generated via a user interface operated by the operator of the work vehicle 132. For instance, the input signals may indicate a particular terrain and/or soil conditions of a field on which the work vehicle 132 is currently driving and/or a load (e.g., the agricultural implement 10) being towed by the work vehicle 132. The particular terrain and/or soil conditions may be determined based on historical sensor data corresponding to the soil conditions in the field.

At block 258, the processor determines soil conditions based on sensor data and the additional data. For example, the processor may utilize certain instructions and algorithms stored in the memory 172 to process the sensor data and the additional data to determine soil conditions, such as soil hardness, moisture, texture, organic content, and so on.

The soil conditions may be used to determine certain agricultural implement parameters, such as a target press wheel tire pressure associated with a downforce applied by the press wheel 46 on soil, desired soil penetration depth beneath of the opener discs 36, desired trench (e.g., with desired depth, width, and shape).

At block 260, the processor determines a target press wheel tire shape based on the soil conditions. For instance, the target press wheel tire shape of the press wheels 46 may include a V-shaped or V-press-like second stage contact patch. During an agricultural implement (e.g., seeding), seeds may be deposited into the trench via the seed tube. Soil (e.g., soil opened by the opener discs 36 may fall back into the trench or be driven into the trench by the closing assembly 40 and the press wheel 46 may compress the soil on top of the seeds, creating a desired soil environment for the seeds, which may be beneficial in certain soil conditions (e.g., hard-packed, or tight soil condition).

At block 262, the processor determines a target pressure of press wheels (e.g., press wheels 46) of the agricultural implement system based on based on the target press wheel tire shape and other target parameters such as target tire firmness, target tire contact area, and the like. For example, the processor may determine the target pressure of the press wheels 46 by predicting press wheel forces (e.g., downforces) applied to the soil.

At block 264, the processor causes a tire inflation system (e.g., the tire inflation system 90) to adjust an internal pressure of the press wheel 46 to match the target pressure (e.g., be within a threshold range of the target pressure) of the press wheels 46. In some embodiments, the processor may cause the central press wheel inflation system (CPWIS) to automatically adjust the internal pressure of the press wheels 46 based on the sensor data, the performance/behavior data, the control signals from the operator in a cab, or a combination thereof. In some embodiments, the processor may cause the CPWIS to automatically modify the shape or contact area of press wheels 46 using variations of press wheel pressure (e.g., having the inflation increase the diameter of outer edges of the press wheels).

A central press wheel inflation system (e.g., CPWIS 130) may provide one or more air lines (e.g., compressed air lines 94) coupled to one or more press wheels 46, which may either be vented or pressurized to change the shape of the press wheels 4, effective contact patch, applied pressure, and depth, and so on, without changing a wheel mounting system (e.g., spring mounting system). The one or more air lines may be coupled to one or more press wheel hubs (e.g., press wheel hub 108), allowing the internal pressure of the press wheels 46 to be either decreased (e.g., vented) or increased (e.g., inflated), thus effectively creating the V-shaped or V-press-like second stage contact patch. In some embodiments, the internal pressure of each press wheel tire 100 may be adjusted individually based on sensor data from a corresponding sensor (e.g., sensor 160 positioned at a respective row unit 12). In some embodiments, the central press wheel inflation system may monitor soil hardness at each row, determine a desired or target shape of each press wheel based on the soil hardness, determine a target pressure based on the target shape, and control (e.g., via the tire inflation system 90) to adjust the internal pressure of the press wheel 46 to match target pressure (e.g., be within a threshold range of the target pressure).

At block 266, the processor receives updated sensor data from the sensors, such as updated tire pressure measurement from the tire pressure sensor 104. For example, after the processor causes the CPWIS 130 to adjust internal pressure of the press wheels 46 to match the target pressure of the press wheels 46, the processor may iteratively monitor the updated sensor data indicative of certain updated performance/behavior data associated with the press wheels, such as the adjusted internal pressure of the press wheels, and/or a press wheel shape sensor. The processor may use the updated sensor data as a feedback to cause the tire pressure system 130 to adjust internal pressure of the press wheel 46, resulting in adjusted forces applied to the soil, which may facilitate firming or packing the soil based on different soil conditions.

In some embodiments, the processor may not use the updated sensor data as a feedback to perform further actions. In such cases, the method 250 may include an open loop in comparison to the close loop illustrated in the FIG. 5.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An air supply system, comprising:
 a compressed air source configured to supply compressed air; and
 a controller configured to control a distribution of the compressed air between the compressed air source and at least one component of an agricultural implement by preforming a plurality of actions, comprising:
  receiving, at a processor of the controller, sensor data from a sensor configured to measure one or more soil conditions in a field;
  determining, via the processor, the one or more soil conditions based at least in part on the sensor data;

determining, via the processor, a target press wheel tire shape based at least in part on the one or more soil conditions, wherein the target press wheel tire shape comprises a V-shaped or V-press-like contact patch of a press wheel tire;

determining, via the processor, a target pressure of a press wheel of a row unit of an agricultural implement based at least in part on the target press wheel tire shape, wherein an increase in the target pressure corresponds to an increase in outer edges of the press wheel tire to establish the V-shaped or V-press-like contact patch of the press wheel tire, and a decrease in the target pressure corresponds to a decrease in the outer edges of the press wheel tire; and controlling, via the processor, a tire inflation system coupled to the press wheel to adjust an internal pressure of the press wheel to correspond to the target pressure.

2. The air supply system of claim 1, wherein the controller is configured to control the tire inflation system to adjust the internal pressure by controlling a pressure valve of the tire inflation system to increase or decrease the internal pressure.

3. The air supply system of claim 1, wherein the compressed air source comprises a compressor configured to output the compressed air to the tire inflation system.

4. The air supply system of claim 3, comprising a valve assembly coupled to a plurality of compressed air lines configured to deliver the compressed air to the tire inflation system.

5. The air supply system of claim 4, wherein the valve assembly comprises one or more valves comprising a multi-way valve, a check valve, or a priority valve.

6. The air supply system of claim 4, wherein the at least one component comprises a plurality of components, and the valve assembly is configured to adjust the distribution of the compressed air between the compressor and the plurality of components comprising the tire inflation system, one or more additional air inflation systems, and one or more pneumatic components of the agricultural implement and a work vehicle towing the agricultural implement in the field.

7. The air supply system of claim 1, wherein the one or more soil conditions comprise soil hardness, moisture, texture, organic content, or a combination thereof.

8. A system, comprising:
a press wheel tire associated with a row unit of an agricultural implement;
a valve assembly coupled to a plurality of compressed air lines configured to deliver compressed air to the press wheel tire;
air supply system, comprising:
a compressor configured to output compressed air to a tire inflation system coupled to the press wheel tire; and
a controller comprising a processor configured to:
receive sensor data from a plurality of sensors configured to measure one or more soil conditions in a field;

determine the one or more soil conditions based at least in part on the sensor data;

determine a target press wheel tire shape based at least in part on the one or more soil conditions, wherein the target press wheel tire shape comprises a V-shaped or V-press-like contact patch of a press wheel tire;

determine a target pressure of the press wheel tire based at least in part on the target press wheel tire shape, wherein an increase in the target pressure corresponds to an increase in outer edges of the press wheel tire to establish the V-shaped or V-press-like contact patch of the press wheel tire, and a decrease in the target pressure corresponds to a decrease in the outer edges of the press wheel tire; and control the tire inflation system to adjust an internal pressure of the press wheel tire to correspond to the target pressure.

9. The system of claim 8, wherein the processor is configured to determine the target press wheel tire shape based on the one or more soil conditions and an internal pressure measurement from a pressure sensor coupled to the press wheel tire.

10. A method, comprising:
receiving, at a processor, sensor data from a sensor configured to measure one or more soil conditions in a field;

determining, via the processor, the one or more soil conditions based at least in part on the sensor data;

determining, via the processor, a target press wheel tire shape based at least in part on the one or more soil conditions, wherein the target press wheel tire shape comprises a V-shaped or V-press-like contact patch of a press wheel tire;

determining, via the processor, a target pressure of a press wheel of a row unit of an agricultural implement based at least in part on the target press wheel tire shape, wherein an increase in the target pressure corresponds to an increase in outer edges of the press wheel tire to establish the V-shaped or V-press-like contact patch of the press wheel tire, and a decrease in the target pressure corresponds to a decrease in the outer edges of the press wheel tire; and controlling, via the processor, a tire inflation system to adjust an internal pressure of the press wheel to correspond to the target pressure.

11. The method of claim 10, wherein the one or more soil conditions comprise soil hardness, moisture, texture, organic content, or a combination thereof.

12. The method of claim 10, comprising:
receiving, at the processor, additional data from a second sensor configured to measure performance or behavior data associated with the row unit.

* * * * *